March 17, 1953 T. VIGMOSTAD 2,631,880
LATCH STRUCTURE FOR VEHICLE BODIES
Filed June 16, 1947 2 SHEETS—SHEET 1
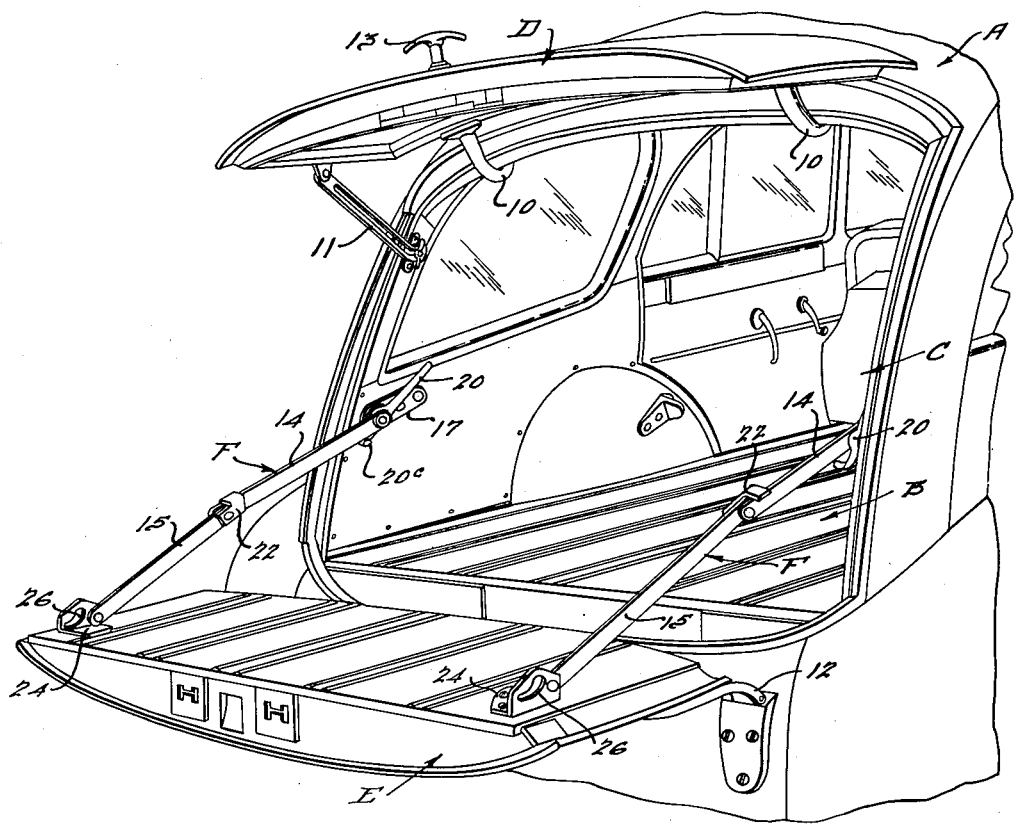
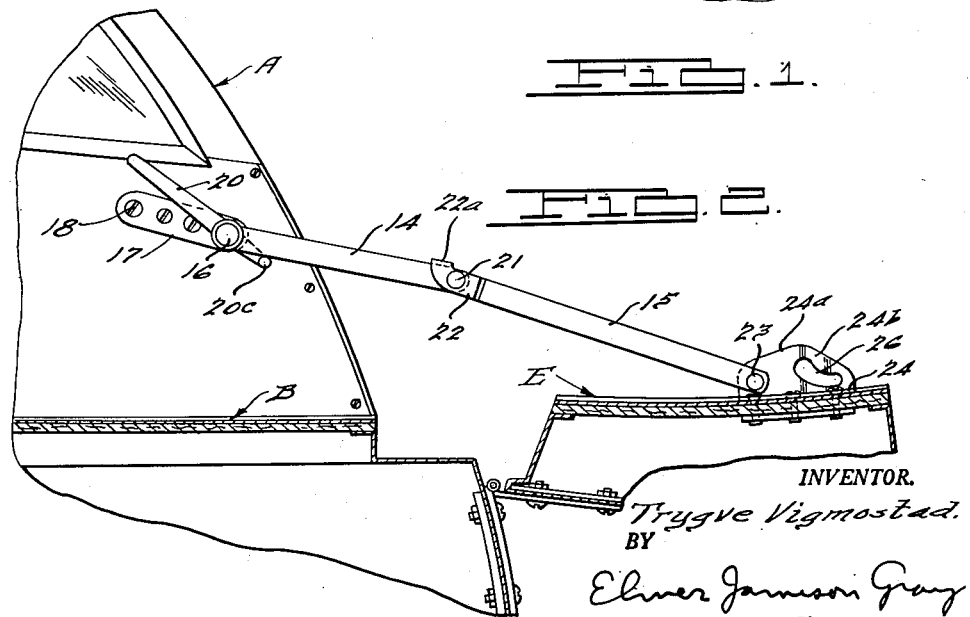
INVENTOR.
Trygve Vigmostad.
BY
Elmer Jamison Gray
ATTORNEY.

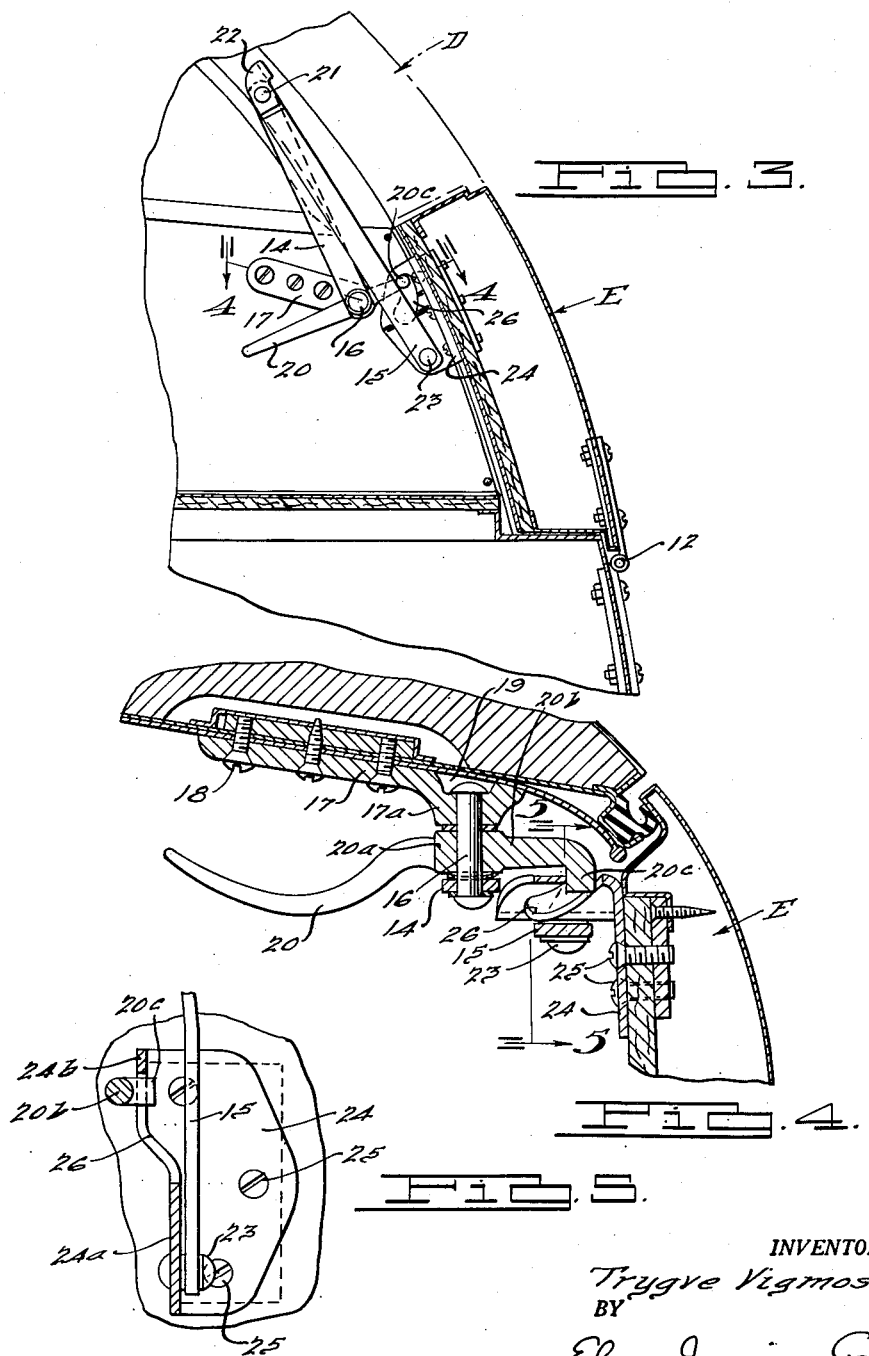

Patented Mar. 17, 1953

2,631,880

UNITED STATES PATENT OFFICE 2,631,880

LATCH STRUCTURE FOR VEHICLE BODIES

Trygve Vigmostad, Detroit, Mich., assignor to Briggs Manufacturing Company, Detroit, Mich., a corporation of Michigan Application June 16, 1947, Serial No. 754,964

5 Claims. (Cl. 292—340)

This invention relates to latch structures for vehicle bodies and particularly to the type of automobile body which is equipped with a luggage compartment in the rear of the tonneau and closure means for this compartment including an upwardly swinging deck lid and a downwardly swinging tail board. Although automobiles of this type are frequently termed station wagons, it will be understood that the invention is not limited to latch structures for vehicle bodies characterized as station wagons since the invention has general applicability to various types of automobile or vehicle bodies.

An object of the invention is to provide an improved latch structure for locking firmly in position a closure member, such as a rear deck lid, hingedly connected to the vehicle body for swinging movement to and from a closed position. The latch structure of the present invention embodies an improved keeper device cooperable, for example, with a turnable handle lever mounted on the body within the luggage compartment which is accessible through an opening at the rear thereof. The keeper device in the illustrated embodiment of the invention comprises a bracket mounted on the inner side of the closure member or deck lid having two laterally offset portions extending one above the other when the lid is in closed position and a cam slot extending from within one of said offset portions to within the other thereof to receive a latch extension or projection of the handle lever. Upon turning the handle lever the latch portion or extension thereof enters the cam slot and by engagement with the edge thereof draws the lid or closure member tightly to its closed position and effectively locks it in such position.

Other objects of this invention will appear in the following description and appended claims, reference being had to the accompanying drawings forming a part of this specification wherein like reference characters designate corresponding parts in the several views.

Fig. 1 is a fragmentary perspective view of the rear end of a vehicle body constructed in accordance with the present invention.

Fig. 2 is a fragmentary longitudinal section illustrating the position of the check device and locking means when the tail board or deck lid member is in fully open position.

Fig. 3 is a view somewhat similar to Fig. 2 illustrating the position of the parts when the tail board or deck lid member is in fully closed position.

Fig. 4 is an enlarged fragmentary section taken substantially through lines 4—4 of Fig. 3 looking in the direction of the arrows.

Fig. 5 is a section taken substantially through lines 5—5 of Fig. 4 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated an automobile body A, such as a body of the type generally referred to as a station wagon, equipped with front and rear seats and having a tonneau open from front to rear. Within the rear of the tonneau is a luggage compartment B accessible from the rear of the vehicle through an opening C adapted to be closed by means of two closure or deck lid members D and E, the latter being frequently referred to as a tail board. The upper deck lid D is hinged in conventional manner by means of hinge arms 10 to the body so as to swing upwardly from a closed position, shown in broken lines in Fig. 3, to an open position shown in Fig. 1. When the deck lid D is raised to this open position it is supported by means of a suitable check device or strut 11. The deck lid or tail board E is suitably hinged at 12 to the body below the luggage compartment opening so as to swing from an upright closed position shown in Fig. 3 to an open generally horizontal position shown in Figs. 1 and 2. When the deck lids D and E are swung from their open positions shown in Fig. 1 to their closed positions, the lid D may be locked to the lid E by means of any conventional locking device controlled by means of a handle 13.

The lower deck lid E is supported in its open generally horizontal position, shown in Figs. 1 and 2, by means of a pair of check arm or strut devices, each of which is identical in construction and generally indicated at F. Each check or strut device F comprises, in the present embodiment of the invention, an inner link or strut member 14 and an outer link or strut member 15, the latter being preferably somewhat longer than the link 14.

As shown particularly in Fig. 4, the inner link or strut member 14 is pivotally mounted at its upper end upon a transverse generally horizontal stud or pin 16 carried by a bracket 17 which is secured by means of screws 18 to the inner side wall of the body adjacent the edge of the deck lid opening C and beneath the rear quarter window of the body. Each bracket 17 is provided at its rear end with an embossment 17a recessed at 19 to receive the outer end of the stud or pin 16 which is upset or riveted over to anchor the stud firmly to the bracket. Also rotatably mounted upon the stud or pin 16 is the hub portion 20a of a forwardly projecting handle 20. This handle is interposed between the end of the link 14 and the bracket embossment 17a, suitable washers being interposed between the parts to permit the link 14 and handle 20 to pivot independently upon the pivot stud or pin 16.

The rear end of the link or strut arm 14 overlaps the adjacent end of the link or strut arm 15 and is pivoted thereto at 21. Rigidly attached to the forward end of the link 15, adjacent the pivot 21, is a retainer piece 22 which has a laterally projecting flange 22a engageable with the upper edge of the link 14, when the links are extended as shown in Figs. 1 and 2, so as to retain them rigidly in end to end position.

The rear end of the link or strut arm 15 of each check device is pivoted at 23 to the projecting flange 24a of an angle bracket 24, the base of this bracket being rigidly secured, as by means of screws 25, to the inside of the deck lid E adjacent the outer edge thereof.

In accordance with the present embodiment of the invention the check device, comprising the pivotally connected links or strut members 14 and 15, firmly supports the deck lid or tail board member E in its generally horizontal position shown in Figs. 1 and 2 so that the upper surface of this tail board member will lie substantially in the plane of the floor or deck of the luggage compartment B. When the deck lid or tail board member E is swung upwardly to closed position, the links or arms 14 and 15 will fold into juxtaposed relation as shown in Fig. 3. In accordance with the preferred embodiment cooperating means is provided upon the handle 20 and the bracket 24 for not only locking the deck lid E in closed position but also for drawing it tightly against the body. Referring to Figs. 4 and 5, the projecting flange 24a of the bracket 24 is offset laterally in the direction of the handle 20 to provide an offset flange portion 24b. A curved cam slot 26 is cut in the flange portions 24a and 24b so that the major portion of this slot is offset laterally from the plane of the flange 24a. The handle 20 is provided with a projecting shank 20b terminating in an inwardly extending latch portion 20c. The normal position of the handle 20, when the deck lid E is unlocked or in open position, is shown in Fig. 2. After this lid has been closed in the manner shown in Fig. 3, the handle 20 may be grasped and swung downwardly so as to force the latch portion 20c upwardly into the cam slot 26. The shape of this slot is such as to cause the latch portion 20c of the handle to ride over the rear edge of the slot 26 and draw the lid tightly against the body. When the handle is forced fully home so as to position the latch projection 20c adjacent the upper edge of the cam slot 26, the deck lid E will be securely locked against any possibility of opening during operation of the vehicle. Manipulation of the handle 20 may be readily accomplished by reaching over the tail board or deck member E into the interior of the luggage compartment while the upper deck lid D is still in open position. Thus, with the handle 20 at each side of the vehicle turned down to the position shown in Fig. 3 the lid will be rigidly locked against movement, whereupon the upper deck lid D may be swung down and latched to the upper edge of the deck lid E by manipulating the handle 13.

I claim:

1. In a vehicle body having a luggage compartment accessible through an opening at the rear thereof, a closure member for said opening hinged adjacent the lower edge thereof to swing from an upright closed position downwardly to a generally horizontal open position, and a turnable handle mounted on the body within said compartment, the combination of a bracket mounted on the inner side of the closure member and having two laterally offset portions extending one above the other when the closure member is in closed position, and a cam slot extending from within one of said offset portions to within the other thereof to receive an extension of said handle, the edge of said slot being engageable with said extension for locking the closure member in closed position.

2. In a vehicle body having a closure member hingedly connected to the body for swinging to and from a closed position and a lever pivoted on the body for swinging about an axis generally parallel to the hinge axis of the closure member, the combination of a keeper comprising two integral portions offset from each other axially of said lever axis, and a cam slot in said keeper having an edge extending from one offset portion to the other and engageable with a projection of the lever for locking the closure member in closed position.

3. In a keeper device engageable with a swinging lever, a keeper bracket comprising two integral portions offset from each other and having a cam slot extending therein from within one offset portion to within the other to receive a portion of the lever therein in locking relation.

4. In a keeper device engageable with a latch member of a swinging lever, a keeper bracket having a projecting member adapted to confront said latch member, said projecting member having a cam slot adapted to receive a latch portion of the latch member and also having a portion offset and adapted to extend toward said latch portion, and said cam slot also extending into said offset portion of said projecting member.

5. A keeper device according to claim 4 wherein the cam slot in said projecting member provides an outlet for said latch portion when moved out of latching position.

TRYGVE VIGMOSTAD.

REFERENCES CITED

The following references are of record in the file of this patent:

UNITED STATES PATENTS

| Number | Name | Date |
| --- | --- | --- |
| 638,845 | Jenks et al. | Dec. 12, 1899 |
| 826,573 | Hubbell | July 24, 1906 |
| 1,024,780 | Hotchkiss | Apr. 30, 1912 |
| 1,331,976 | Barger | Feb. 24, 1920 |
| 1,412,191 | Monk | Apr. 11, 1922 |
| 1,538,823 | Killion | May 19, 1925 |
| 1,567,867 | Schrader | Dec. 29, 1925 |
| 1,810,351 | Hines | June 16, 1931 |
| 1,887,210 | Miller | Nov. 8, 1932 |
| 1,941,432 | Doering | Dec. 26, 1933 |
| 2,226,072 | Polack | Dec. 24, 1940 |
| 2,263,065 | Baldauf | Nov. 18, 1941 |
| 2,422,912 | Kling | June 24, 1947 |
| 2,433,169 | Stephenson et al. | Dec. 23, 1947 |